United States Patent Office 3,314,898
Patented Apr. 18, 1967

3,314,898
POLYMERIZATION OF TETRAHYDROFURAN
Junji Furukawa and Takeo Saegusa, Kyoto, and Hirosuke Imai, Kobe, Japan, assignors to Zaidan Hojin Nihon Kagaku Seni Kenkyusho, Kyoto, Japan, a corporation of Japan
No Drawing. Filed Feb. 18, 1963, Ser. No. 259,408
Claims priority, application Japan, Mar. 31, 1962, 37/12,118
4 Claims. (Cl. 260—2)

The present invention relates to a method of polymerization of tetrahydrofuran, more particularly to the ring-opening polymerization of tetrahydrofuran by using a catalyst system consisting of an organoaluminum compound and a co-catalyst with or without water.

It has heretofore been known that organoaluminum compounds polymerize aldehydes and various cyclic ethers, e.g., alkylene oxides such as ethylene oxide and propylene oxide or oxetane compounds such as 3,3-bis-(chloromethyl) oxacyclobutane. But tetrahydrofuran cannot be polymerized by an organoaluminum compound alone.

The inventors have found that tetrahydrofuran can be polymerized by the catalytic system consisting of an organoaluminum compound and a co-catalyst, and also that the catalyst system consisting of three components, i.e., an organoaluminum compound, water and a co-catalyst, sometimes has much higher activity than that of the two components without water.

An organoaluminum compound by itself has no catalytic activity for the polymerization of tetrahydrofuran and is usually decomposed by water. Therefore it is absolutely unexpected that an organoaluminum compound can be made catalytically active by means of a co-catalyst, and be activated further by addition of a suitable amount of water.

The organoaluminum compounds to be used in the invention may be expressed by the general formula of $R_{3-n}AlX_n$, wherein R represents alkyl, aryl, cycloalkyl, or aralkyl groups; X represents halogen; and $n$ is 0, 1 or 2. Examples of such organoaluminum compounds are trimethylaluminum, triethylaluminum, tripropylaluminum, tributylaluminum, trihexylaluminum, tricyclohexylaluminum, triphenylaluminum, trinaphthylaluminum, diethylaluminum monochloride, ethylaluminum dichloride, ethylaluminum sesquichloride. Sometimes water activates the catalytic system consisting of an organoaluminum compound and one or more co-catalysts. The amount of water to be used for the preparation of the catalyst system may be about 0.01 to 2 moles per mole of the organoaluminum compound, and the optimum effect can be obtained at about 0.5–1.5 moles.

The effective co-catalysts to be used together with the organoaluminum compound with or without water are classified into the following two groups:

(1) Cyclic alkylene oxides having the general formula

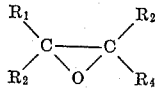

wherein $R_1$, $R_2$, $R_3$ and $R_4$ are radicals selected from the group consisting of —H, and alkyl, and (2) A four membered cyclic lactone, compound.

Cyclic alkylene oxides of the above type which are suitable in the present invention include for example cyclic ethylene oxide, propylene oxide, 1-butene oxide, 2-butene oxide and isobutylene oxide. Suitable four membered cyclic lactones include for example β-propiolactone, β-butyrolactone, α-butyrolactone and diketene. One or more of the above co-catalysts can be used together and such use sometimes produces a synergistic effect.

The polymerization may be carried out in the presence of solvent (solution polymerization) or in the absence of solvent (bulk polymerization). Tetrahydrofuran may be added to the catalytic system consisting of the catalyst (organoaluminum) and the co-catalysts with or without water, or the co-catalyst may be added to a mixture of tetrahydrofuran and catalyst (organoaluminum) with or without water, or the catalyst with or without water may be added to a mixture of tetrahydrofuran and co-catalyst. Thus, there is no special limitation to the order and method of mixing the catalyst components and tetrahydrofuran. For instance, in a suitable solvent water may be added to the organoaluminum compound and to the reaction mixture thus obtained are added a co-catalyst and tetrahydrofuran, or water and a co-catalyst may be added to a mixture of the organoaluminum compound and tetrahydrofuran, or the organoaluminum compound may be added to a mixture of a co-catalyst, tetrahydrofuran and water, or any other order of mixing may be taken. Further, when water is added as a component of the catalyst system, it may be added also to the mixture of the organoaluminum compound, co-catalyst and the tetrahydrofuran monomer. When using a polymerization solvent the rate of polymerization is usually reduced to some extent, nevertheless a suitable polymerization solvent may be used if desired. The polymerization solvents are aliphatic and aromatic hydrocarbons, ethers, halogenated hydrocarbons and any other solvents which do not produce a substantial adverse effect on the polymerization. The amount of solvent is not limited.

The processes of catalyst preparation and polymerization are to be carried out in an inert atmosphere, e.g., nitrogen atmosphere.

The polymerization temperature ranges from −78° C. to 200° C., preferably −780° C. to 100° C.

The amount of organoaluminum compounds to be used as the catalyst is 0.01 to 50 mole percent for the tetrahydrofuran monomer, preferably 0.1 to 10 mole percent, and the amount of the co-catalyst is taken usually at least 1 mole percent for organoaluminum compounds. Even if the quantity of the co-catalyst is larger than that of the catalyst the polymerization is of course possible, yet in some cases (for instance, when cyclic compounds are used as the co-catalyst) a substantial quantity of co-catalyst will be incorporated in the product polymers.

The invention will now be explained with examples.

*Examples 1–4*

0.0025 mole of triethylaluminum, 0.0025 mole of various co-catalysts and 0.25 mole of tetrahydrofuran were sealed in a test tube under nitrogen atmosphere and kept stand-still at 0° C. for one day. The solid polymer thus produced was washed with an aqueous solution of dilute hydrochloric acid, then dried in vacuo. The viscosity of the polymer solution was measured on a solution of 0.2 g. of the polymer in 100 ml. of benzene at 30° C. The results are shown in the following table.

Example 1 in the table is a reference run in which no co-catalyst was added:

| Example | Co-catalyst | Polymer Yield (Percent) | $\eta_{sp}/C$ (dl./g.) |
|---|---|---|---|
| 1 | None | 0 | |
| 2 | Propylene oxide | 25.8 | 3.49 |
| 3 | β-propiolactone | 0.5 | |
| 4 | Diketene | 0.3 | |

*Examples 5–7*

In a test tube in nitrogen atmosphere, 0.00315 mole of triethylaluminum was dissolved in 0.125 mole of tetrahydrofuran and to the solution was added 0.00315 mole of water, and to the mixture were added 0.00630 mole of one of various co-catalysts as shown in the following table. Then the test tube was sealed and kept standstill for two days at 0° C. After the polymerization has completed, the solid polymer thus obtained was washed with dilute aqueous solution of hydrochloric acid and dried in vacuo. The viscosity of the polymer was measured on a solution of 0.2 g. of polymer in 100 ml. of benzene at 30° C.

The results are shown in the following table.

| Example | Co-catalyst | Polymer Yield (Percent) | $\eta_{sp}/C$ (dl./g.) |
|---|---|---|---|
| 5 | Propylene oxide | 32.9 | 0.56 |
| 6 | $\beta$-propiolactone | 99.0 | 0.19 |
| 7 | Diketene | 44.5 | 1.06 |

Reference runs: When a catalyst system of an organoaluminum compound and water are used under the same conditions as in the Examples 5 to 7 without the co-catalyst, tetrahydrofuran could not be polymerized.

What we claim is:

1. A method for producing polytetrahydrofuran comprising polymerizing tetrahydrofuran in the presence of a catalyst comprising an organoaluminum compound having the general formula $$R_{(3-n)}AlX_n$$

wherein R is a radical selected from the group consisting of alkyl, aryl, cycloalkyl an daralkyl, X is a halogen and $n$ is an integer from 0–2 and a cocatalyst selected from the group consisting of $\beta$-propiolactone, $\beta$-butyrolactone, $\alpha$-butyrolactone and diketene.

2. The method of claim 1 wherein said catalyst system further comprises water, the mole ratio of said water to said organoaluminum compound being up to about 2.

3. The method of claim 1 wherein said organoaluminum compound is present in an amount of from about 0.01 to 50.0 mole percent of the tetrahydrofuran monomer and said co-catalyst is present in an amount of at least about 1 mole percent based on the amount of organoaluminum compound present.

4. The method of claim 1 wherein said organoaluminum compound is present in an amount of from 0.1 to 10 mole percent of the tetrahydrofuran monomer.

References Cited by the Examiner

UNITED STATES PATENTS 3,259,590   7/1966   Weissermel et al. _____ 260—2

FOREIGN PATENTS 1,258,138   2/1961   France.

OTHER REFERENCES

Stille: Introduction to Polymer Chemistry, published by Wiley & Sons, New York, 1962, pages 130–132.

JOSEPH L. SCHOFER, *Primary Examiner.*

J. A. SEIDLECK, L. WOLF, L. G. CHILDERS,
*Assistant Examiners.*